United States Patent
Steinberg et al.

(10) Patent No.: US 6,788,853 B2
(45) Date of Patent: Sep. 7, 2004

(54) METHOD FOR CLEAVING INTEGRATED OPTIC WAVEGUIDES TO PROVIDE A SMOOTH WAVEGUIDE ENDFACE

(75) Inventors: Dan A. Steinberg, Blacksburg, VA (US); Mindaugas F. Dautartas, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 0 days.

(21) Appl. No.: 09/878,486

(22) Filed: Jun. 11, 2001

(65) Prior Publication Data

US 2002/0001435 A1 Jan. 3, 2002

Related U.S. Application Data

(60) Provisional application No. 60/214,626, filed on Jun. 28, 2000.

(51) Int. Cl.$^7$ ................................................. G02B 6/30
(52) U.S. Cl. ....................................................... 385/49
(58) Field of Search ............................. 385/14, 65, 49, 385/83, 85, 88, 89, 92

(56) References Cited

U.S. PATENT DOCUMENTS

| | | |
|---|---|---|
| 3,774,987 A | 11/1973 | Boivin ........................ 350/96 |
| 3,934,773 A | 1/1976 | Chinnock et al. .............. 225/2 |
| 4,217,032 A | 8/1980 | Sheem |
| 4,466,696 A | 8/1984 | Carney ...................... 350/96.2 |
| 4,639,074 A | 1/1987 | Murphy |
| 4,750,804 A | 6/1988 | Osaka et al. |
| 4,756,590 A | 7/1988 | Forrest et al. |
| 4,818,059 A | 4/1989 | Kakii et al. |
| 4,966,433 A | 10/1990 | Blonder .................... 350/96.17 |
| 5,046,809 A | * 9/1991 | Stein ............................ 385/49 |
| 5,073,003 A | 12/1991 | Clark |
| 5,123,068 A | 6/1992 | Hakoun et al. |
| 5,163,113 A | 11/1992 | Melman |
| 5,181,263 A | 1/1993 | Derfiny |
| 5,185,835 A | 2/1993 | Vial et al. |
| 5,297,228 A | 3/1994 | Yanagawa et al. |
| 5,342,478 A | 8/1994 | Welbourn .................... 156/643 |
| 5,357,593 A | 10/1994 | Bossler ........................ 385/49 |
| 5,371,818 A | 12/1994 | Presby ........................ 385/49 |
| 5,390,271 A | 2/1995 | Priest |
| 5,479,540 A | 12/1995 | Boudreau et al. |
| 5,499,309 A | 3/1996 | Kozuka et al. |
| 5,499,312 A | 3/1996 | Hahn et al. |
| 5,518,965 A | 5/1996 | Menigaux et al. .......... 437/228 |
| 5,535,296 A | 7/1996 | Uchida |
| 5,548,673 A | 8/1996 | Kitamura et al. ............. 385/49 |
| 5,557,695 A | 9/1996 | Yamane et al. ............... 385/49 |
| 5,577,142 A | 11/1996 | Mueller-Fiedler et al. |
| 5,623,564 A | 4/1997 | Presby |
| 5,627,931 A | 5/1997 | Ackley et al. |
| 5,700,382 A | 12/1997 | Splett ........................ 216/24 |

(List continued on next page.)

FOREIGN PATENT DOCUMENTS

| | | |
|---|---|---|
| DE | 3914835 | 7/1990 |
| EP | 0395854 | 7/1994 |

*Primary Examiner*—Neil Abrams
*Assistant Examiner*—Thanh-Tam Le
(74) *Attorney, Agent, or Firm*—Niels Haun; Jonathan D. Baskin

(57) ABSTRACT

In an integrated optical waveguide device including a first top portion on the substrate, and a plurality of juxtaposed waveguide cores within cladding layers on a second top portion of the substrate, the waveguide cores having respective inner endfaces parallel to a longitudinal open slotway formed in the substrate between the first and second top portions, the substrate being undercut from the slotway to produce a cantilevered section of the waveguide cores and cladding layers, for permitting the plurality of waveguide cores and associated cladding layers to be simultaneously cleaved, thereby providing a smooth endface thereacross.

62 Claims, 11 Drawing Sheets

U.S. PATENT DOCUMENTS

| | | | |
|---|---|---|---|
| 5,787,214 A | 7/1998 | Harpin et al. ............... 385/49 |
| 5,920,665 A | 7/1999 | Presby | |
| 5,926,599 A | 7/1999 | Bookbinder et al. | |
| 5,961,683 A | 10/1999 | Mizuta et al. ............... 65/386 |
| 5,970,200 A | 10/1999 | Takikawa et al. | |
| 6,048,107 A | 4/2000 | Pubanz | |
| 6,062,741 A | 5/2000 | Tachigori | |
| 6,081,638 A | 6/2000 | Zhou | |
| 6,103,344 A | 8/2000 | Ota et al. | |
| 6,132,107 A | 10/2000 | Morikawa | |
| 6,157,759 A * | 12/2000 | Seo et al. ............... 385/49 |
| 6,163,639 A | 12/2000 | Ollier et al. | |
| 6,215,946 B1 | 4/2001 | Sherrer | |
| 6,241,399 B1 | 6/2001 | Nobuhara | |
| 6,257,772 B1 | 7/2001 | Nakanishi et al. | |
| 6,259,841 B1 * | 7/2001 | Bhagavatula ............... 385/47 |
| 6,360,043 B1 * | 3/2002 | Bostock et al. ............... 385/49 |
| 6,363,201 B2 | 3/2002 | Sherrer et al. | |
| 6,393,685 B1 * | 5/2002 | Collins ............... 29/416 |
| 6,435,734 B2 * | 8/2002 | Okada et al. ............... 385/88 |
| 6,470,118 B1 * | 10/2002 | Uno ............... 385/49 |
| 6,526,204 B1 | 2/2003 | Sherrer et al. | |
| 6,595,700 B2 | 7/2003 | Steinberg et al. | |

\* cited by examiner

METHOD FOR CLEAVING INTEGRATED OPTIC WAVEGUIDES TO PROVIDE A SMOOTH WAVEGUIDE ENDFACE

RELATED APPLICATION

This Application is related to and takes priority from co-pending Provisional Application Ser. No. 60/214,626, filed on Jun. 28, 2000, for "METHOD FOR CLEAVING INTEGRATED OPTIC WAVEGUIDES." Also, this Application is related to co-pending Ser. No. 09/614,155, filed on Jul. 11, 2000, for "Open Face Optical Fiber Array for Coupling To Integrated Optic Waveguides and Optoelectronic Submounts." The Assignee for the Provisional Application, for Ser. No. 09/614,155, and for this present Application, is the same.

FIELD OF THE INVENTION

The present invention is related generally to fiberoptic cables and waveguides, and optical coupling therebetween. More specifically, the present invention relates to a method for making the endfaces of a plurality of fiberoptic waveguides on a substrate have a smooth surface for substantially reducing light scattering, and providing high-efficiency coupling with the end of a fiberoptic cable or optical fiber.

BACKGROUND OF THE INVENTION

It is known in the art to use semiconductor substrates for providing a support for an optical waveguide formed on a substrate. Typically, one end of the waveguide is optically coupled to an end of a fiberoptic cable or optical fiber for permitting light waves to travel therebetween. Coherent light waves such as produced by lasers, are employed in fiberoptic communication systems, for example, for transmitting data signals through use of optical waveguides to couple the light waves to and from fiberoptical cables to photodetector and other circuitry.

A major problem providing high-efficiency optical coupling between optical waveguides and fiberoptic cables or optical fibers. It is important to achieve as near perfect alignment near the end of the fiberoptic cable and the endface of the waveguide for maximizing the transfer of light therebetween. Also, it is important to avoid any surface irregularity on the endface of the waveguides that may cause light scattering.

It is known in the prior art to form one or more V-grooves in <100> silicon wafers, for retaining an optical fiber or fiberoptic cable, for coupling to the endfaces of waveguides cores formed in an opposing portion of the substrate. Note that although silicon (Si) is typically used for the substrate, other substrate materials include but are not limited to Gallium Arsenide (GaAs), and Indium Phosphide (InP).

In forming optical waveguides on various substrates, it is known in the art to employ different fabrication processes depending on the substrate material. The fabrication process may incorporate any one of chemical vapor deposition (CVD), fire flame deposition, and so forth. In such fabrication, V-grooves may be formed via chemical etching on one portion of the substrate. In this regard, anisotropic etchants for silicon substrates include potassium hydroxide (KOH), KOH and alcohol, ethylene diamine, and so forth. Etchant solutions for providing an anisotropic etching of GaAs or InP substrates include solutions of sulphuric acid ($H_2SO_4$), hydrochloric acid (HCl), bromic acid (HBr), and so forth. During such processing, masking is required for producing the proper formations, whereby the mask must have a relatively low etch rate. Examples of methods for forming V-grooves and optical waveguides in different portions of semiconductor substrates, and methods for the use of such grooves in retaining a portion of an optical fiber or cable, and aligning the same with an associated waveguide having an endface opposite the groove are shown in U.S. Patents of Carney U.S. Pat. No. 4,466,696, Welbourn U.S. Pat. No. 5,342,478, Menigaux et al. U.S. Pat. No. 5,518,965, Kitamura et al. U.S. Pat. No. 5,548,673, Yamane et al. U.S. Pat. No. 5,557,695, and Mizuta et al. U.S. Pat. No. 5,961,869. The teachings of these references are incorporated herein to the extent that they do not conflict herewith.

Much effort has been made in the prior art to develop better methods for coupling optical fibers or fiberoptic cables to waveguides formed on a semiconductor substrate. Examples of methods and apparatus for accomplishing such coupling are provided in many U.S. Patents, including Boivin U.S. Pat. No. 3,774,987, Blonder U.S. Pat. No. 4,966,433, Stein U.S. Pat. No. 5,046,809, Bossler U.S. Pat. No. 5,357,593, Bresby U.S. Pat. No. 5,371,818, and Harpin et al. U.S. Pat. No. 5,787,214. The teachings of the previously identified U.S. Patents are incorporated herein by reference to the extent that they do conflict herewith.

The teachings of Menigaux U.S. Pat. No. 5,518,965, entitled "Process For Producing A Structure Integrating A Cleaved Optical Guide With An Optical Fiber Support For A Guide-Fibre Optical Coupling," issued on May 21, 1996. This reference teaches the formation of a V-groove in one end portion of a semiconductor substrate in one embodiment, and also in the opposing end portion in another embodiment. An optical waveguide is formed on the portion of the substrate not containing a V-groove. A method is taught for cleaving the ends of the waveguide for forming the endface or endfaces thereof, for coupling to the ends of optical fibers.

It is known in the art to provide an integrated optic chip with one or more V-grooves formed in one portion of a substrate, and one or more waveguides formed in another portion of the substrate, with endfaces of the waveguide cores opposing respective ones of the V-grooves. An example of a substrate formed with a plurality of V-grooves and waveguide cores, as indicated, is shown in FIG. 1. More specifically, as shown, a substrate 1 has a plurality of juxtaposed V-grooves formed in a top first portion of the substrate 1. In an opposing top second portion of the substrate 1, a cladding layer 5. A plurality of waveguide cores 7 are formed within the cladding, as shown, with their longitudinal axes parallel to one another and to the parallel axes of the V-grooves 3. In the example shown, a dicing saw is used to form a transverse rectangular open slot 9 between the portions of the substrate 1 containing the V-grooves 3 and the waveguide cores 7. In this manner, the sloping endface walls of the V-grooves 3 are removed to provide vertical walls, for insuring that the ends of optical fibers 11 carried in the V-grooves 3 can abut endfaces 13 of the waveguide cores 7. However, such use of a dicing saw produces a rough surface on the endfaces of the waveguides 7, making it difficult to obtain high-efficiency coupling between the waveguide cores and optical fibers 11 carried in the V-grooves 3. Good coupling is precluded by light scattering caused by the rough surface on the waveguide endfaces 13 and sidewall 15 of the substrate 1. Polishing of the endfaces 13 of the waveguide cores 7 can serve to reduce the light scattering, and improve the efficiency of optical coupling thereto. However, such polishing is extremely difficult.

SUMMARY OF THE INVENTION

An object of the invention is to provide an efficient method for forming a smooth endface for a plurality of waveguides formed on a semiconductor substrate along with opposing V-grooves.

Another object of the invention is to provide a method for simultaneously cleaving a portion of the coupling ends of a plurality of waveguide layers or cores formed on a semiconductor substrate, in a manner avoiding cleaving of the substrate.

Yet another object of the invention is to provide a method for efficiently and simultaneously cleaving coupling end portions of a plurality of waveguide cores formed in cladding on a semiconductor substrate, for providing a smooth endface on the waveguide cores, thereby providing high-efficiency coupling to the ends of associated optical fibers or fiberoptic cables, respectively.

With the problems of the prior art in mind, the above-identified objects and other objects of the invention are satisfied in one embodiment by a method including the steps of initially forming a plurality of V-grooves in one top portion of a semiconductor substrate, with a plurality of waveguide cores equal in number to the number of V-grooves formed within a cladding layer or layers on another top portion of the semiconductor substrate, with endfaces of the waveguide cores opposing respective ones of ends of the V-grooves. A dicing saw or other means is used to form an open slotway between the portion of the substrate V-groove or grooves, and the portion of the substrate with the waveguide cores. In one embodiment, after using a dicing saw to form the open slotway, the portion of the substrate with the V-grooves is masked along with a portion of the open slotway. Then, an etchant is used to undercut through the sidewall of the portion of the substrate immediately below the cladding and waveguide core layers for undercutting the latter to provide a cantilevered waveguide portion. The mask material is removed, and a scribe line is formed across the transverse portion of the top surface of the cladding and waveguide core layers, with the scribe line preferably being parallel to the edge of the undercut portion of the substrate immediately underlying the cladding and waveguide core layers. Next, a downward force directed toward the V-grooves is applied to the cantilevered portion of the waveguide forward of the scribe line. The force cleaves the cladding and waveguide core layers, providing a smooth endface for the waveguide cores opposing respective V-grooves.

In a second embodiment of the invention, the open slotway is cut into the substrate at an angle via a dicing saw, followed by the aforesaid masking, etching, scribing, and cleaving steps.

In a third embodiment of the invention, the scribe line is formed on the top cladding layer forward of the top edge of the underlying substrate proximate the undercut portion of the substrate. In this third embodiment, a force is applied to the cantilevered portion of the cladding and waveguide core layers, causing these layers to breakaway leaving the endfaces Of the cladding and waveguide core layers at an angle.

In a fourth embodiment of the invention, the angled slotway is formed as previously indicated, but the scribe line is formed on the top cladding layer in alignment with the top edge of the underlying substrate proximate the undercut portion. This step is followed by masking, and then etching for forming the undercut. Next, the scribe line is formed in alignment with the top edge of the underlying substrate proximate the undercut portion, followed by cleaving to leave a smooth and vertically oriented endface for the cladding and waveguide core layers.

In a fifth embodiment of the invention, the cleaving force is provided by gluing the end of an object to the end of the cantilevered portion of the cladding and waveguide core layers. Setting of the glue is followed by pulling the object to apply a tension force on the cantilevered end (the force is longitudinally directed away from this end). Simultaneously a downward directed force can also be applied to the object proximate the region where it is connected to the cantilevered end of the waveguide and cladding layers, for cleaving the latter.

In a seventh embodiment of the invention, a high stress layer is formed on top of the cladding, with the front edge of the high stress layer being aligned with the edge of the substrate proximate the undercut region thereof. The high stress layer can be formed from an appropriate metal, such as nickel. Thereafter, the cantilevered portion of the cladding and waveguide layers can be cleaved by applying a downward force. In the latter embodiment, it is preferred but not absolutely necessary to use a scribe line before cleaving.

BRIEF DESCRIPTION OF THE DRAWINGS

Various embodiments of the present invention are described in detail below with reference to the drawings, in which like items are identified by the same reference designation, wherein.

DETAILED DESCRIPTION OF THE INVENTION

Figure 1:
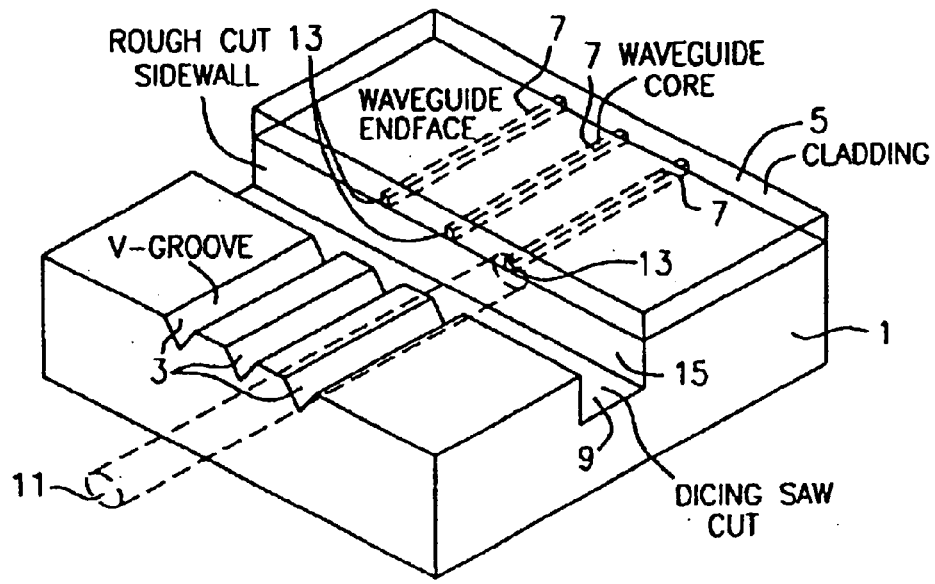
FIG. 1 shows a pictorial view of a device including a substrate having V-grooves formed in one portion, and cladding and waveguide core layers formed in another portion. The substrate has an open rectangular slot formed between these portions through use of a dicing saw, for example.
Figure 2:
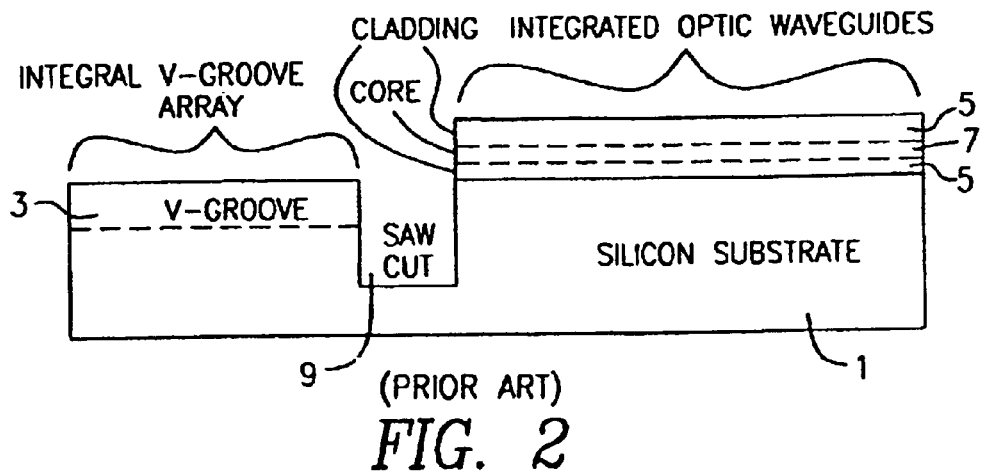
FIG. 2 is a right-side elevational view of the device of FIG. 1.

With reference to FIG. 1, it is known to form an integrated circuit chip for coupling the ends of optical fibers 11 to endfaces of a waveguide 5,7, through use of a semiconductor substrate 1 in which one or more V-grooves 3 are formed. One portion of the top of the substrate includes the V-grooves 3. One or more waveguide cores 7 are formed within a cladding layer 5 formed on top of another portion of the substrate 1. A dicing saw is typically used to cut a rectangular slotway 9 into the substrate 1 and through the cladding and waveguide core layers 7. Note that other methods can be used to form slotway 9. For certain applications, the degree of rough polishing provided by the dicing saw for the endface or endfaces 13 of the waveguide core 7, and for the sidewall 15 of the slotway 9, permits sufficient coupling between optical fibers or fiberoptic cables 11 retained in the V-grooves 3, with respective waveguide cores 7. However, in applications requiring high-efficiency coupling, the polishing provided by the dicing saw is inadequate, for the resultant rough surface causes light scattering. Note that FIG. 2 shows a right-side elevational view of the pictorial of FIG. 1.

Various embodiments of the invention will now be described with reference to FIGS. 2 through 19, all showing right-side elevational views of the desired device as it is being processed through various processing steps, and steps for alternative embodiments of the invention. In describing various embodiments of the invention, the steps are illustrated in association with a silicon substrate 1, but as indicated above, many different substrate materials can be utilized. Different substrate materials may require different masking materials, and different etchant solutions, as also indicated above.

Figure 3:
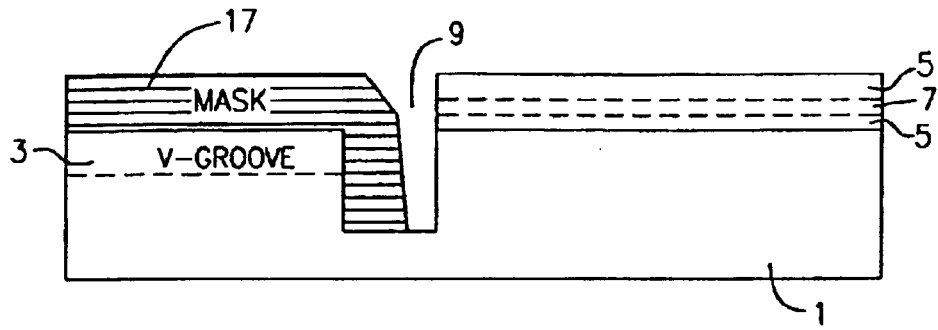
FIG. 3 shows the application of a mask to the substrate of FIG. 2 for a first step for a first embodiment of the invention.

In a first embodiment of the invention, with reference to FIGS. 2–8, the slotway 9 is narrower than 5 times the diameter of the optical fibers 11 placed in the V-grooves 3. This prevents the optical fibers 11 from bending between associated respective V-grooves 3 and the endfaces 13 of the waveguide cores 7. In practice, the width of the slotway 9, to achieve the aforesaid, is 40 to 200 microns. The next step, shown in FIG. 3, is to apply a masking material over the portions of the substrate including the V-grooves 3, and a portion of the slotway 9, for protecting these areas from etchant material used in the following step. The mask material can be polyamide or photoresist, or any other suitable masking material.

Figure 4:
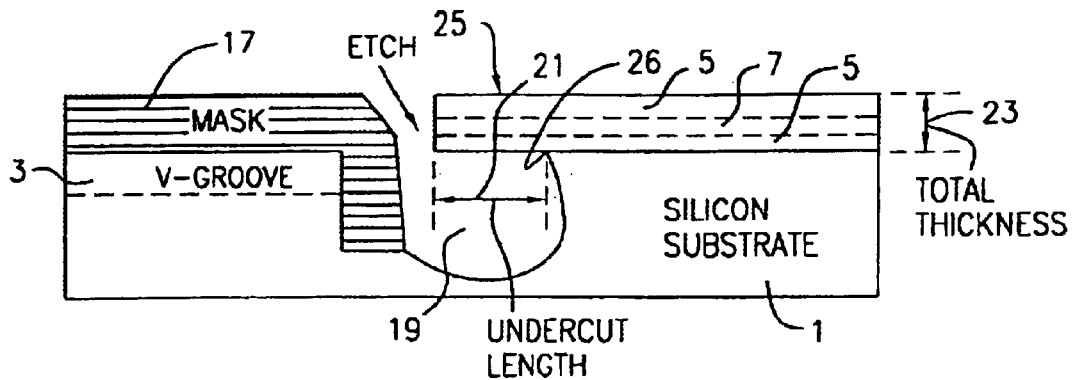
FIG. 4 shows the second step for the first embodiment of the invention for etching a portion of the substrate of FIG. 2 to form an undercut section below cladding and waveguide core layers.

The next step is to expose the device to an appropriate silicon etchant for the silicon substrate 1, in this example, for undercutting the cladding layers 5 and waveguide core layers 7. In the preferred embodiment, an isotropic etchant is used. However, an anisotropic etchant can also be used, an example being potassium hydroxide (KOH) on silicon. Either a dry or a wet etchant can be used. Note that an example of a dry isotropic etchant for Si is Xenon Flouride. The result obtained from such undercutting is shown in FIG. 4. The undercut region is designated as reference numeral 19, and the arrow 21 shows the measurement of the length of the undercut. It is preferred that this length 21 be about 1.5 to 10 times the total thickness 23 of the waveguide 5,7,5. Typically, waveguide core layers 7 and cladding layers 5 have a total thickness of about 40 to 50 microns, and for such thickness it is preferred that the length of the undercut 21 be about 100 to 200 microns, but it can range from 50 to 400 microns, depending upon the application. The undercut is of course, related to the total cantilevered length of the fiber. The cantilevered length of the fiber should stay below about seven diameters, at most.

Figure 5:
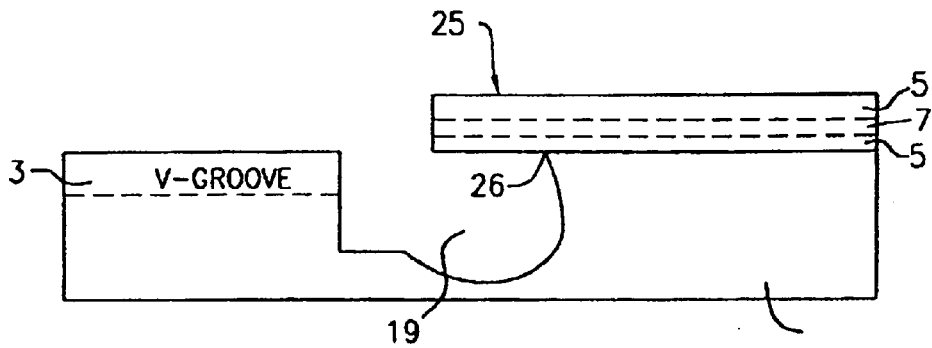
FIG. 5 shows a right-side elevational view of the device of FIG. 4 with the masking material removed.

In the next step, the mask 17 is removed from the substrate 1. One known method for doing so is by ashing in an oxygen plasma, but any known method can be utilized. With the mask 17 removed, the device appears as shown in FIG. 5, at this stage of the processing.

Figure 6:
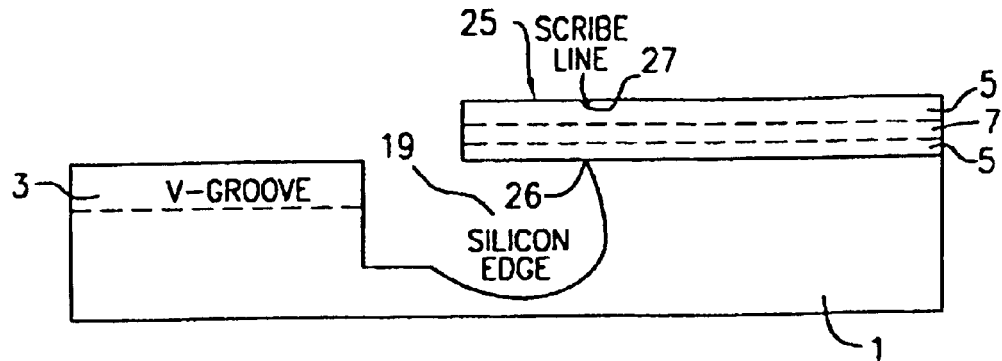
FIG. 6 shows the location of a scribe line on a top portion of the cladding layer of the device of FIG. 5.

As shown in FIG. 6, in the preferred embodiment of the invention, a scribe line 27 is formed transversley on the top surface of the topmost cladding layer 5. It is also preferred that the scribe line 27 be aligned with the silicon edge 26 of the undercut portion of substrate 1, as shown. However, use of the scribe line 27 may not be necessary in certain applications. Accordingly, in such applications, use of the scribe line 27 is optional.

Figure 7:
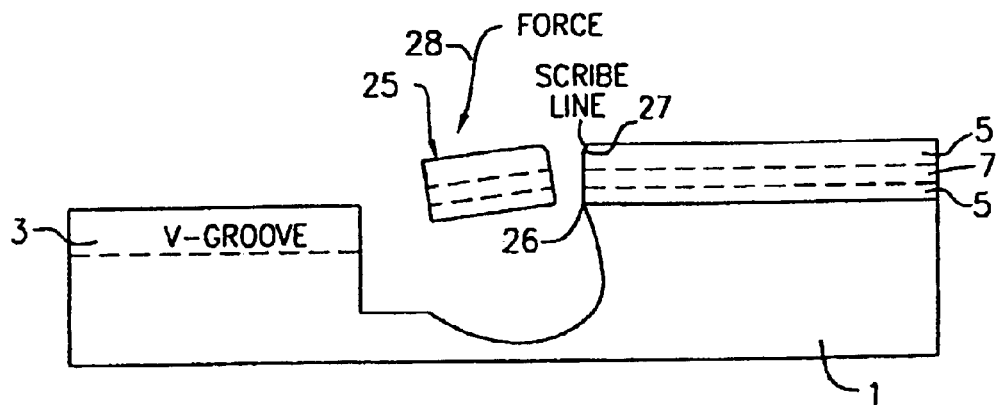
FIG. 7 shows the application of a force upon the cantilevered portion of the cladding and waveguide core layers of the device of FIG. 6.

The next step, as shown in FIG. 7, is to apply a substantially downwardly directed force 28 to the cantilevered end 25 of the waveguide comprising cladding layers 5 and the waveguide core layers 7. As shown in FIG. 7, the force is preferably directed downward and toward the V-grooves 3 as indicated by the arrow 28. It is important to note that both the direction of the downward force and magnitude thereof must be controlled for insuring that the bottom portion of the waveguide layers 7, 5 are not placed into compression, but are placed under a small tensile force. In this manner, the cantilevered end 25 of the waveguide can be cleaved to provide a clean, smooth break, for the resulting endfaces 13 for the waveguide cores 7 and associated cladding layers 5 (see FIG. 1).

It is important to note that through use of the aforesaid steps, all of the waveguide cores 7, and associated cladding layers 5, are cleaved at the same time, in that the cantilevered waveguide portion 25 is cleaved along the entire scribe line 27, with the cleavage propagating down to the silicon edge 26, in this example, that is along the edge 26 of the undercut portion of the substrate 1 of whatever desired material. Note that the cleaving force can be applied utilizing any one of known methods in the art for obtaining and applying such a force. For example, a liquid jet, such as a water jet directed in the direction of force arrow 28 can be utilized. Alternatively, the back surface of the waveguide layers 5, 7, 5 can have a laser pulse applied thereto of high enough magnitude to generate a shockwave for breaking off the cantilevered waveguide portion 25. Yet another method for obtaining the necessary force is to place the device in an ultrasonically agitated bath. A fourth method to obtain the force is to press an elastomer sheet against the top surface of the topmost cladding layer 5, whereafter the sheet is dragged across the surface for pulling away the cantilevered waveguide portion 25. Other methods are described below with reference to FIGS. 17 through 19.

It is preferred that the cleaving force applied to the cantilevered waveguide portion 25 is an impulse force. Such impulse forces are produced by known scribe-and-cleave tools.

In the present device, it is preferred that the total distance between the ends of the V-grooves 3 terminating at the slotway 9, and the endfaces 13 of the waveguide cores 7 be made less than 6 times the diameter of optical fibers 11 installed in the V-grooves 3. Such dimensioning ensures that the optical fibers 11 do not bend or slope into the slotway 9 between the terminating ends of the V-grooves 3 and the endfaces 13 of the waveguide cores 7. It should be noted that in a number of known fiber arrays, for example an open-face fiber array, such bending of the optical fibers 11 cannot occur, avoiding the necessity of controlling the distance between the terminating ends of the V-grooves 3 and the waveguide endface 31. An example of an open-face fiber array is given in co-pending Ser. No. 09/614,155, filed Jul. 11, 2000, for "Open Face Optical Fiber Array for Coupling to Integrated Optic Waveguides and Optoelectronic Submounts." The teachings of this Application are incorporated herein by references to the extent they do not conflict herewith. However, in applications where bending can occur, it is preferred that when optical fibers 11 of 125 micron diameter are used, that the distance between the terminating ends of the V-grooves 3 and the waveguide endface 31 be less than 700 microns. To obtain ultimate performance, it is preferred that the aforesaid distance be less than 300 microns. However, the lower limit of this distance 29 is determined by the width of the saw cut, or slotway 9, and the length 21 of the undercut portion 19. Accordingly, the dicing saw cut for forming slotway 9 should be made as narrow as practical, and the undercut length 21 should be minimized to the greatest extent possible. In other words, regardless of the formation method used, it is preferred that the slotway 9 be as narrow as practical.

Figure 8:
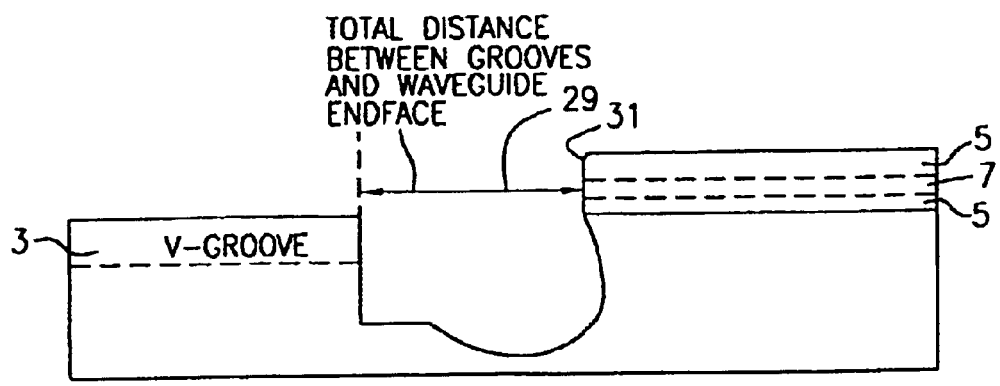
FIG. 8 shows the measurement of the distance between the ends of V-grooves and the endfaces of the waveguide layer of the device of FIG. 7.
Figure 12:
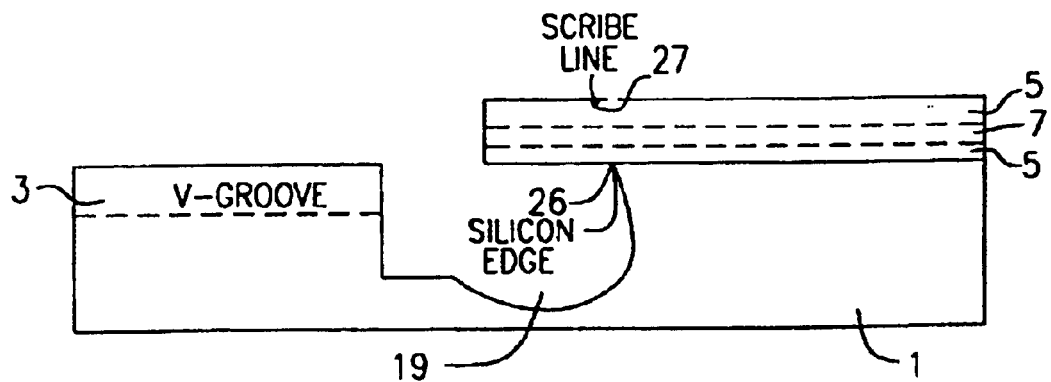
FIG. 12 shows the device of FIG. 5 with a scribe line formed forward of the top edge of the substrate underlying the cantilevered portion of the cladding and waveguide core layers.
Figure 13:
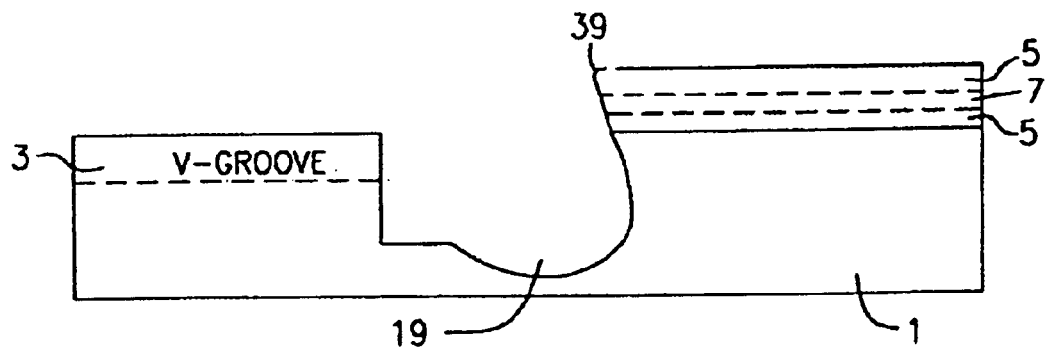
FIG. 13 shows the effect of cleaving the cantilevered portion of FIG. 12 for providing an angled endface for the waveguide cores and cladding layers.

With the cantilevered end portion 25 cleaved away, the device appears as shown in FIG. 8. Note that the arrow 29 shows the measurement of the distance between the terminating ends of the V-grooves 3 and the waveguide 5, 7, 5 endface 31. With regard to the first embodiment of the invention, one can choose to locate the scribe line 27 forward of the substrate edge 26, as shown in FIG. 12. After the aforesaid cleaving step, the waveguide endface 39 will be slightly angular as shown in FIG. 13.

Figure 9:
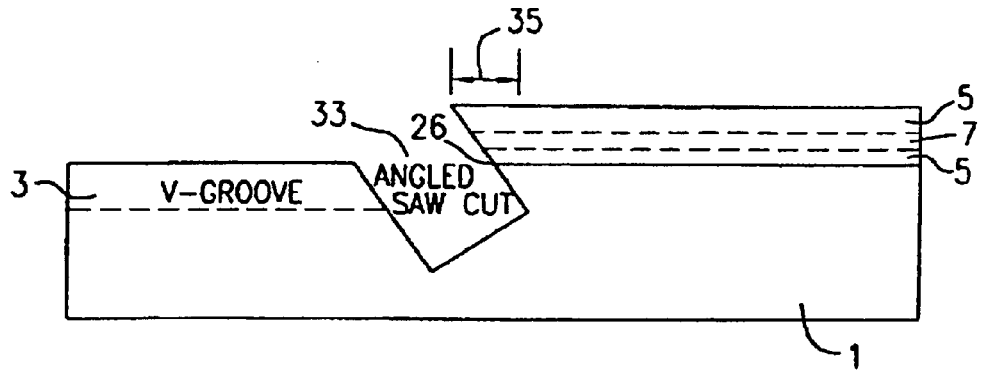
FIG. 9 shows a second embodiment of the invention utilizing an angled open slot between the V-groove portion of the substrate, and the cladding and the waveguide core layered portion of the device.
Figure 10:
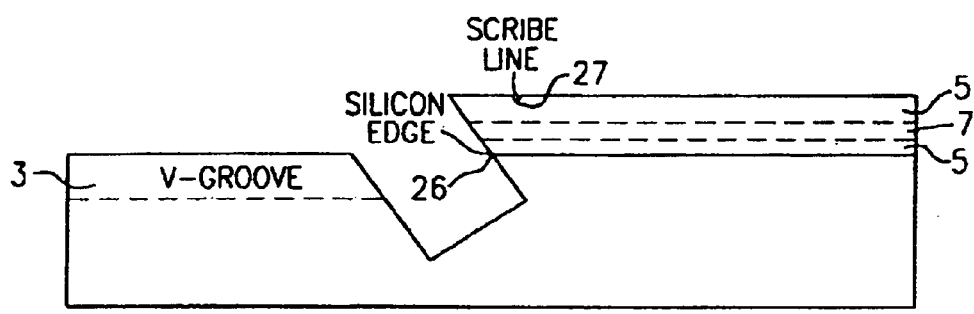
FIG. 10 shows the formation of a scribe line on the top of the cladding layer of the device of FIG. 9.
Figure 11:
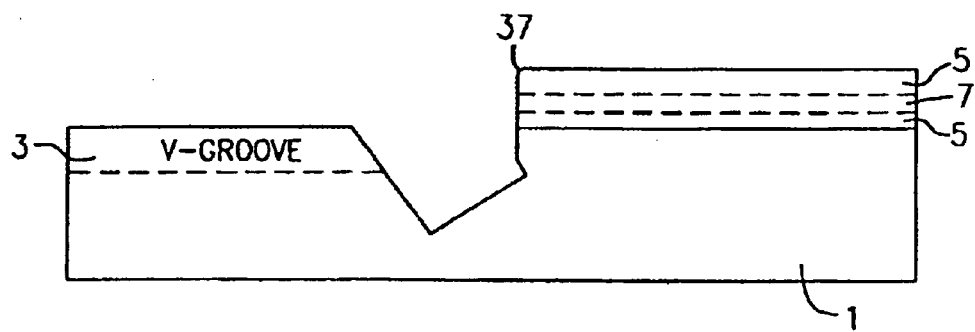
FIG. 11 shows the device of FIG. 10 after cleaving of the cantilevered portion of the cladding, waveguide cores, and a portion of the substrate of the device of FIG. 10.

Another embodiment of the invention is shown in FIG. 9 for providing an angled slotway 33 formed by a dicing saw cut, for example. The angled slotway 33 can have an angle of about 30 to 60 degrees relative to the horizontal plane of the present device or substrate 1. The next step is form a scribe line 27, as shown in FIG. 10, aligned with the edge 26 of the substrate 1 in a preferred embodiment, or the scribe line 27 can be located within 20 to 30 microns to the right of the edge 26. Note that the measurement arrow 35 in FIG. 9 shows the distance from the top edge of the topmost cladding layer 5 to the substrate edge 26. As in the previous embodiment, the next step is to apply a downwardly directed force to cleave the cantilevered end 25 of the waveguide 5, 7, 5. After such cleaving, the device is left with a smooth waveguide endface 37, as shown in FIG. 11.

Figure 14:
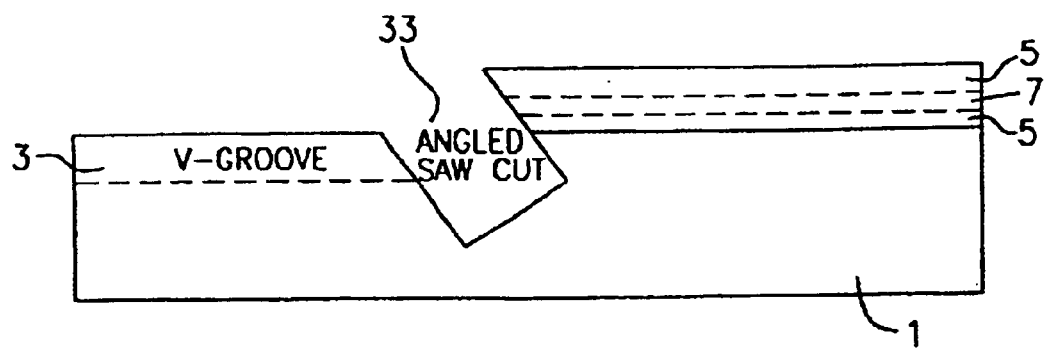
FIG. 14 shows the first step for another embodiment of the invention whereby a dicing saw is used to cut an angled saw cut into the substrate between the V-groove portion and the cladding and waveguide core layered portion.
Figure 15:
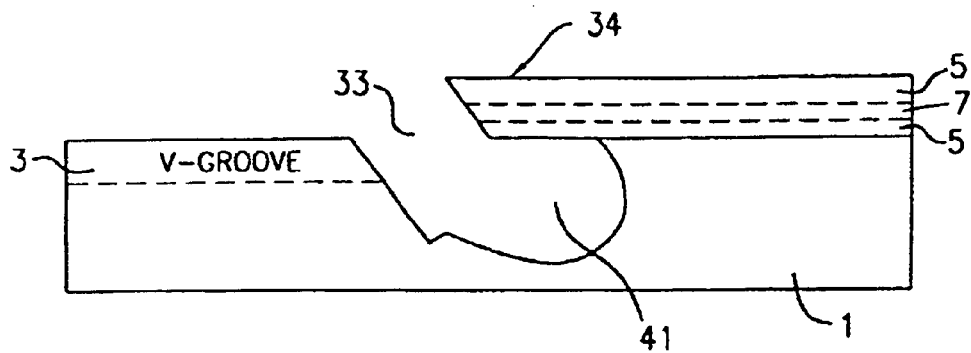
FIG. 15 shows the next step from that of FIG. 14 for next steps from that of FIG. 14 for etching an undercut portion into the substrate, as shown.
Figure 16:
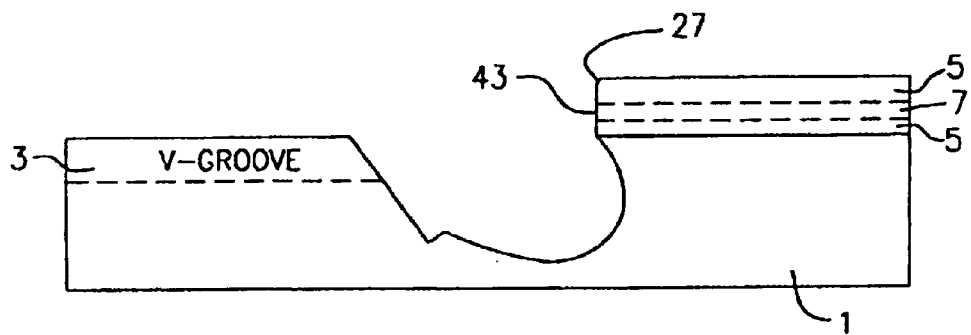
FIG. 16 shows the device formed after the steps of scribing the device of FIG. 15, followed by cleaving thereof.

In yet another embodiment of the invention, an angled saw cut can be used to form an angled slot 33, as shown in FIG. 14, similar to that of FIG. 9. However, after this step, the V-groove or grooves 3 are masked as previously taught above in the first embodiment of the invention, followed by an etching step to undercut the waveguide 5, 7,5 portion of the device, as shown in FIG. 15. The undercut portion 41 provides a substantially greater cantilevered waveguide end portion relative to the embodiment of the invention merely using an angled slotway before cleaving. The previously described steps of mask removal, followed by cleaving are then used to cleave the cantilevered end portion 34 for providing the device as shown in FIG. 16.

Figure 17:
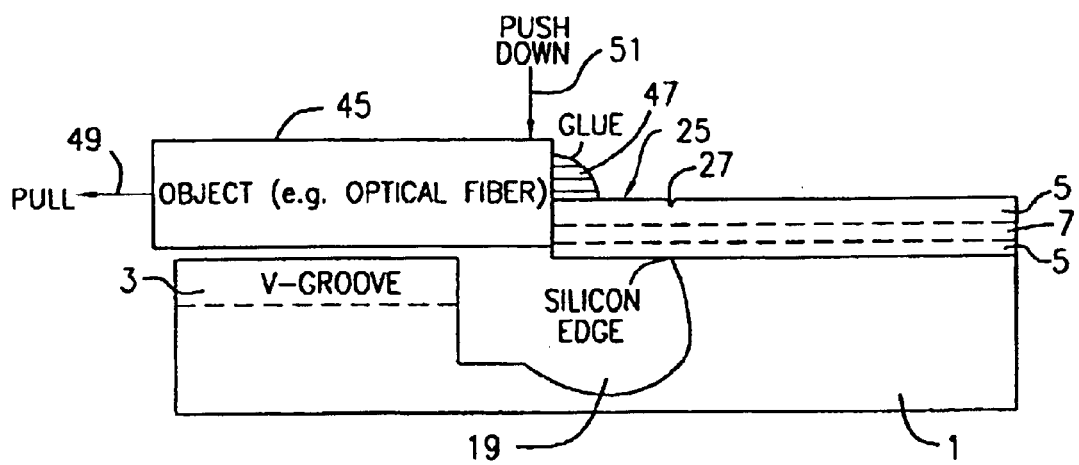
FIG. 17 shows another embodiment of the invention for providing an alternative step after forming the device of FIG. 6.
Figure 18:
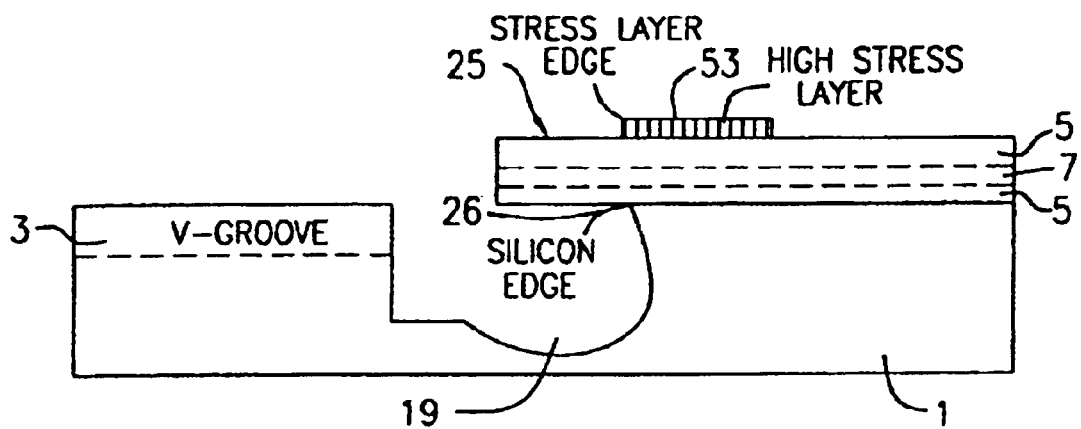
FIG. 18 shows yet another embodiment of the invention for a step following obtainment of the configuration of FIG. 5, for applying a high stress layer on the top of the uppermost cladding layer, followed by cleaving of the cantilevered portion of the cladding and waveguide layers.

In another embodiment of the invention, the cleaving force can be applied by simultaneously using a downward force in combination with a tensile force, which can be accomplished as shown in FIG. 17. In this embodiment, an object such as an optical fiber 45 has its end glued to the end of the cantilevered portion 25. After the glue 47 has cured (the glue 47 can be a UV curing epoxy), a pulling force 49 is applied to the end of the optical fiber 45 in a direction parallel to the longitudinal axes of the waveguide 5,7,5, simultaneous with applying a vertically downward directed force 51 to the end of the object 45 proximate the cantilevered waveguide portion 25, as shown.

Figure 19:
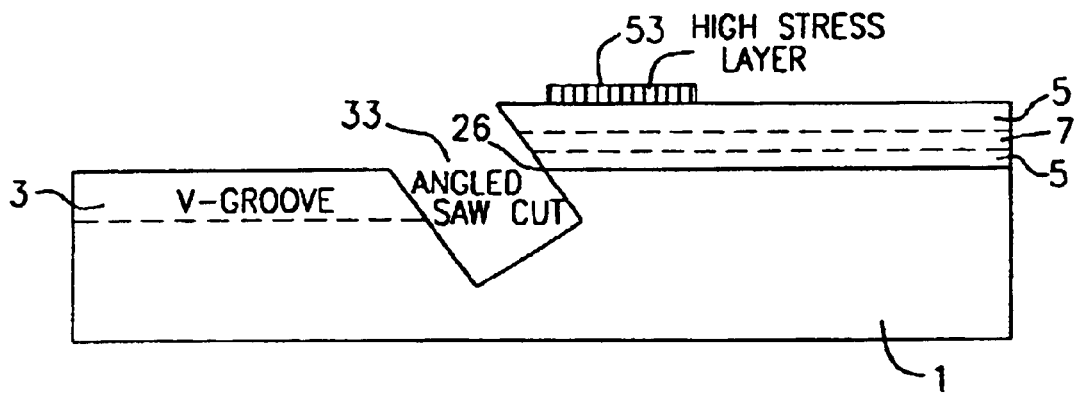
FIG. 19 shows another embodiment of the invention following the obtainment of the configuration of the device of FIG. 9, for forming a high stress layer on the top of the top cladding layer, followed by cleaving of the cantilevered portion of the cladding and waveguide core layers.

Alternatively, for the embodiments of the invention associated with FIGS. 5 and 9, for example, cleavage of the waveguide 5, 7, 5 can be improved through use of a high-stress layer 53 applied on the top of the topmost cladding layer 5, as shown. The high-stress layer material can be a metal, such as nickel, in the case of a silicon substrate 1. It is important that the high-stress layer 53 have a high tensile stress when deposited on the cladding layer 5. It is also preferred that the forward edge of the high stress layer be aligned with the substrate edge 26, as shown. Through use of such a high stress layer, a localized area of high stress is applied to the waveguide layers 5,7,5 close to the edge of the high stress layer 53. It may not be necessary to also use a scribe line 27 when such high stress layers 53 are employed. Note further that it is preferred as shown in FIG. 19 to use such a high stress layer 53 in combination with the angled slotway 33, in view of the substrate edge 26 formed by an angled saw cut being relatively simple to align with the edge of the high stress layer 53. By contrast, it is very difficult to employ isotropic etching of silicon for accurately forming a scribe line aligned with the substrate edge 26.

In many applications, it may be necessary to remove the high stress layer 53 from the waveguide device after cleaving, to prevent the stress in the waveguide 5,7,5 applied by the high stress layer 53 from interfering with the optical properties (e.g. birefringence) of the waveguide core 7. If nickel is used for the high stress layer 53, it can be removed through use of a processing step involving a nickel etch, for example.

Figure 20:
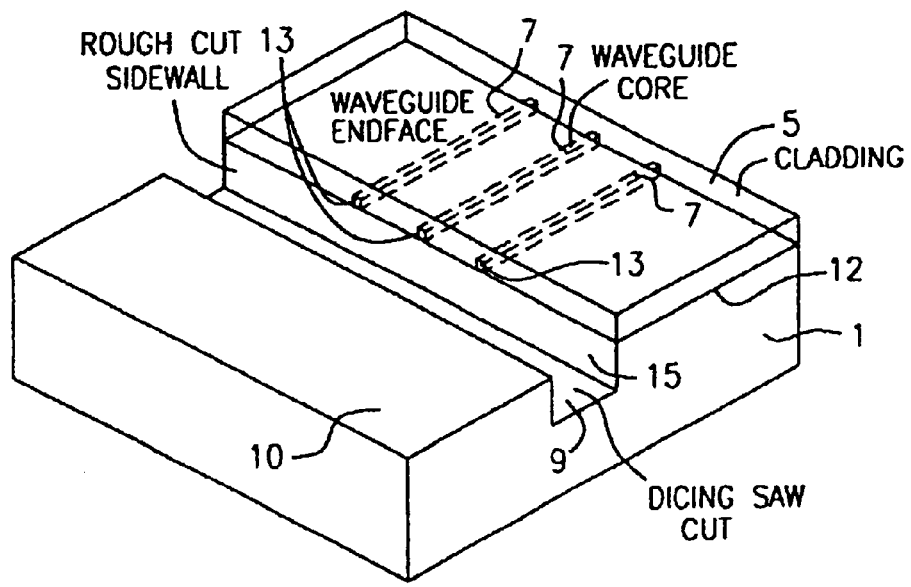
FIG. 20 shows a pictorial view of an integrated circuit chip for another embodiment of the invention.

In another embodiment of the invention, as shown in FIG. 20, an integrated optic chip similar to that of FIG. 1, but without V-grooves 3 is divided by the linear slotway 9 into a first portion 10, and a second portion 12. The second portion 12, as with previously described embodiments has a plurality of waveguide cores 7 formed on it within a cladding Layer 5. The waveguide cores 7 have their longitudinal axes aligned perpendicular to the slotway 9. Other than this, cleaving is used as identically described for the embodiments of FIGS. 3 through 19, for producing smooth inner endfaces 13 for the plurality of waveguide cores 7, respectively.

Figure 21:
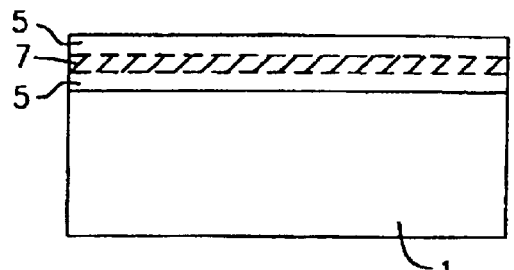
FIG. 21 shows a side elevational view of a substrate with a plurality of layers formed on its top surface, for yet another embodiment of the invention.
Figure 22:
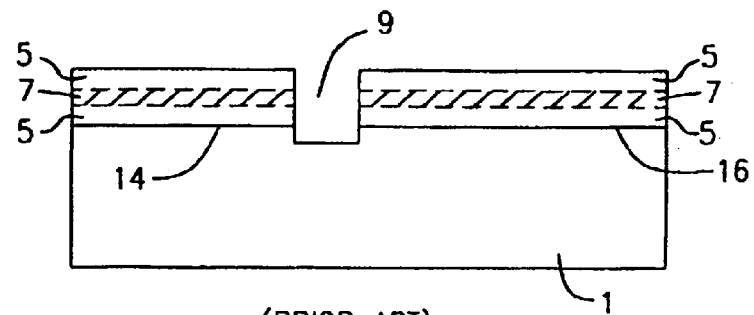
FIG. 22 shows a side elevational view of the embodiment of FIG. 21 with a slot formed therein.

In yet another embodiment of the invention, one can start with the device of FIG. 21, which includes a substrate 1, having formed on a top surface thereof a plurality of spaced apart waveguide cores 7 within a cladding layer 5. The waveguide core 7 and cladding layer 5 are formed in a similar matter to that shown in FIG. 20, except that the starting device has the waveguide cores and cladding layer covering the entire top surface of the substrate 1. As shown in FIG. 22, similar to other embodiments of the invention described above, a linear slotway 9 is formed through the cladding layer 5, and waveguide core 7 into the substrate 1. As a result of forming the slot 9, the device of FIG. 22 includes a first substrate portion 14, and second substrate portion 16, each with a plurality of spaced apart waveguide cores 7 in a cladding layer 5 on a top surface thereof, as shown.

Figure 23:
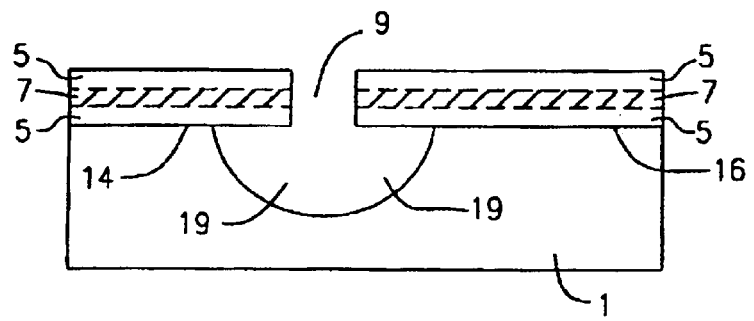
FIG. 23 shows a side elevational view of the result of undercutting the substrate from the slot shown in FIG. 22.

The next step in the processing is to undercut the substrate 1 from both sides of the slotway 9 in substantially the same manner as described for providing the undercut region 19 for the embodiment of FIG. 4. The only difference is that in this embodiment, the use of the mask 17 is not required, in that the substrate 1 is being undercut from both sides of the slotway. The resulting device configuration at this stage in the processing is as shown in FIG. 23. Note that in this embodiment, for the example given, integrated optics are being utilized in the form of waveguide cores 7 within a cladding layer 5 over substrate portion 14, as previously described. However, the invention is not limited to providing integrated optics on substrate portion 14, whereby the cladding layer or layers 5 and waveguide cores 7 can be replaced by a conventional mask (such as silicon nitride, for example), or other desired layers that require smooth endfaces as provided in the various embodiments of the invention.

Figure 24:
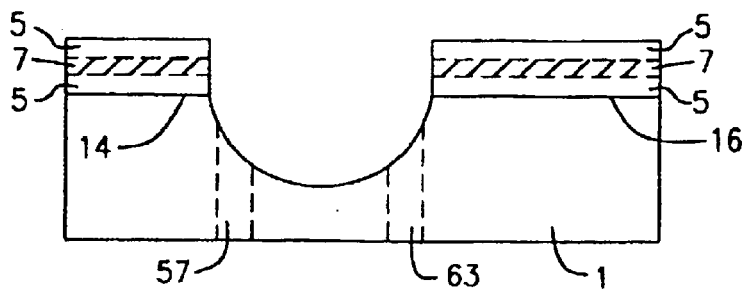
FIG. 24 is a side elevational view showing the result of cleaving cantilever portions of the cantilevered regions shown in FIG. 23.
Figure 25:
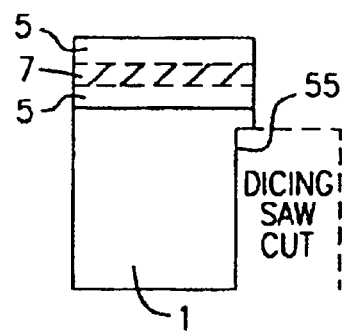
FIG. 25 shows a side elevational view of the result of singulating the device of FIG. 24 through use of a dicing saw cut for still another embodiment of the invention.
Figure 26:
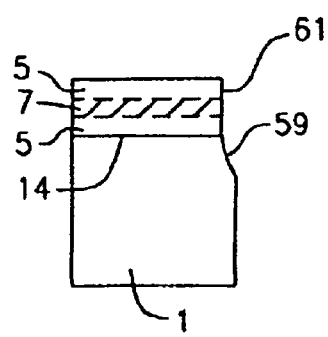
FIG. 26 shows a side elevational view of the device that remains via singulating the left hand portion of the device of FIG. 24.
Figure 27:
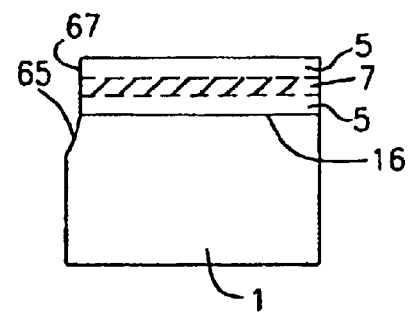
FIG. 27 shows a side elevational view of the result of singulating a right hand portion of the device of FIG. 24.
Figure 28:
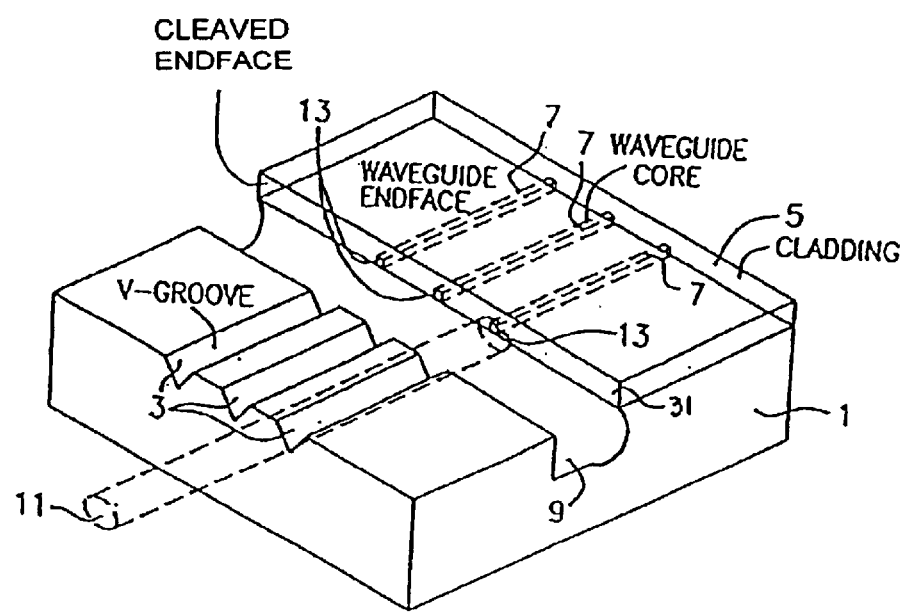
FIG. 28 illustrates a perspective view of the device of FIG. 8.

The next step is to cleave the cantilevered portions for producing the device configuration as shown in FIG. 24. The device of FIG. 24 can be singulated through use of a dicing saw for providing the device configuration as shown in FIG. 25, wherein a dicing saw cut 55 is shown in phantom. Alternatively, as shown in FIG. 24, a dicing saw can be used to cut out portion 57 of the device of FIG. 24, for providing the device configuration shown in FIG. 26 that is left with a residual etched area 59 proximate a smoothly cleaved endface surface 61, as shown. Similarly, a dicing saw can be used for cutting out a portion 63 of the device of FIG. 24, for providing device configured as shown in FIG. 27, that is left with a residual etched area 65 proximate a smoothly cleaved endface surface 67, as shown.

Although various embodiments of the invention have been shown and described, they are not meant to be limiting. Those of skill in the art may make certain modifications to these embodiments, which modifications are meant to be covered by the spirit and scope of the appended claims. For example, for the embodiments of the invention shown in FIGS. 18 and 19, the high stress layer 53 can also be provided by nickel/iron alloy material. Also, the waveguides can be formed on a substrate other than as taught above. In practice the waveguides must include waveguide cores 7, but cladding layers 5 may or may not be included, depending upon the particular application. In devices including cladding layers 5, it is preferred that the cladding layers 5 be cleaved a transverse distance of three to ten times the width of a waveguide core 7, simultaneous to cleaving the associated waveguide cores 7. Note also that although V-grooves 3 have been shown and described herewith, the grooves 3 are not meant to be limited to a V-shape, and can have any practical cross sectional shape.

What is claimed is:

1. A method for providing a smooth endface in an integrated optical waveguide, the integrated optical waveguide including a semiconductor substrate, a linear open slotway dividing said substrate into first and second portions, a plurality of spaced apart first waveguides formed on said second portion of the substrate in a common first cladding layer, with longitudinal axes of said plurality of first waveguides being perpendicular to the longitudinal axis of said slotway, and with inner endfaces of said plurality of first waveguides being parallel to the longitudinal axes of said slotway, said method comprising the steps of:

undercutting said substrate from a sidewall of said slotway and under said plurality of first waveguides for a predetermined distance, thereby forming a first cantilevered waveguide section overlying the undercut portions of said substrate; and applying a force upon said first cantilevered waveguide section to cleave it and the common first cladding layer from said substrate, thereby producing smooth inner endfaces for said plurality of first waveguides.

2. The method of claim 1, wherein said undercutting step includes the steps of:

masking said first top portion of said substrate; and applying an etchant into said slotway for undercutting said substrate to form a predetermined length of said first cantilevered waveguide section.

3. The method of claim 1, comprising a step of forming said open slotway to include walls that are perpendicular to a horizontal plane of said substrate.

4. The method of claim 1, wherein said undercutting step includes cutting a slot at an angle to undercut the plurality of first waveguides.

5. The method of claim 1, further including after said undercutting step, the step of forming a scribe line on the top of said first cantilevered waveguide section, said scribe line being parallel to the slotway.

6. The method of claim 5, further including forming said scribe line to lie in the same vertical plane as a transverse edge of said substrate beneath said first cantilevered waveguide section.

7. The method of claim 2, further including, after said etching step, the step of forming a scribe line on the top of said plurality of first waveguides, said scribe line being parallel to the slotway.

8. The method of claim 3, further including immediately after said undercutting step, the step of forming a scribe line on the top of said plurality of first waveguides, said scribe line being parallel to the slotway.

9. The method of claim 7, further including forming said scribe line to lie in the same vertical plane as a transverse edge of said substrate beneath said first cantilevered waveguide section.

10. The method of claim 8, further including forming said scribe line to lie in the same vertical plane as a transverse edge of said substrate beneath said cantilevered waveguide section.

11. The method of claim 1, wherein said cleaving step further includes having a force component of said cleaving force angled toward said first portion of said substrate.

12. The method of claim 1, wherein said cleaving step further includes orienting the applied force to avoid compression of bottom portions of said waveguide, and to place the latter in tension.

13. The method of claim 1, further including after said undercutting step the steps of:

rigidly securing one end of an elongated object to the end of the cantilevered waveguide section; and said cleaving step further including pulling the object to apply tension to the cantilevered waveguide section.

14. The method of claim 5, further including immediately after said step of forming a scribe line, the steps of:

rigidly securing one end of an elongated object to the end of the cantilevered waveguide; and said cleaving step further including pulling said object to apply tension to said cantilevered waveguide section.

15. The method of claim 1, further including after said undercutting step the step of:

depositing a high stress layer on top of said first waveguides behind their said first cantilevered waveguide section, with a forward edge of said high stress layer being aligned with a transverse edge of the undercut portion of said substrate.

16. The method of claim 15, wherein said high stress layer consists of a metal exhibiting a high tensile stress.

17. The method of claim 5, further including after forming said scribe line, the step of:

depositing a high stress layer on top of said first waveguides behind their said first cantilevered section, with a forward edge of said high stress layer being adjacent said scribe line.

18. The method of claim 17, wherein said high stress layer consists of a metal exhibiting a high tensile stress.

19. The method of claim 18, wherein said metal is nickel.

20. The method of claim 1, further including the step of forming a plurality of grooves in juxtaposition in said first portion of the substrate, said plurality of grooves each having a longitudinal axis perpendicular to the longitudinal axis of said slotway.

21. The method of claim 20, wherein said plurality of grooves are V-grooves, respectively.

22. The method of claim 20, wherein the total distance between respective inner ends of said plurality of grooves, and the inner endface of opposing ones of said plurality of first waveguides is less than six times the outside diameter of an optical fiber.

23. The method of claim 1, further including the step of forming said plurality of first waveguides within said common first cladding layer that extends the length of said slotway.

24. The method of claim 1, wherein the cleave extends the entire width of said substrate.

25. The method of claim 1, wherein said substrate includes a plurality of spaced apart second waveguides formed on said first portion of said substrate in a common second cladding layer, with longitudinal axes of said plurality of second waveguides being perpendicular to the longitudinal axis of said slotway, and with inner endfaces of said plurality of second waveguides being parallel to the longitudinal axis of said slotway; and wherein the method comprises the steps of:

undercutting said substrate from another sidewall of said slotway and under said plurality of second waveguides for a predetermined distance, thereby forming a second cantilevered waveguide section overlying the associated undercut portions of said substrate, and applying a force upon said second cantilevered waveguide section to cleave it and said common second cladding from said substrate thereby producing smooth inner endfaces for said plurality of second waveguides.

26. The method of claim 25, wherein said undercutting steps are performed by applying an etchant into said slotway for undercutting said substrate to form predetermined lengths of said first and second cantilevered waveguide sections.

27. The method of claim 26, wherein said step of forming said open slotway includes forming walls of said slotway that are perpendicular to a horizontal plane of said substrate.

28. The method of claim 25, further including after said undercutting steps, the step of forming first and second scribe lines on the top of each of said first and second cantilevered waveguide sections, respectively, said first and second scribe lines each being parallel to said slotway.

29. The method of claim 28, further including forming said first and second scribe lines to lie in the same vertical plane as transverse edges of said substrate beneath said first and second cantilevered waveguide sections, respectively.

30. The method of claim 25, wherein said cleaving steps for said first and second cantilevered waveguide sections, respectively, each further include orienting the respective applied cleaving force to avoid compression of bottom portions of the associated waveguide, and to place the latter in tension.

31. The method of claim 25, further including after said undercutting step(s) the step of:

depositing first and second high stress layers on top of said first and second waveguides behind their said first and second cantilevered waveguide sections, respectively, with forward edges the respective first and second high stress layers being aligned with associated transverse edges of respective undercut portions of said substrate.

32. The method of claim 31, wherein said first and second high stress layers each consist of a metal exhibiting a high tensile stress.

33. The method of claim 28, further including after forming said first and second scribe lines, the steps of:

depositing first and second high stress layers on top of said first and second waveguides, respectively, behind their respective said first and second cantilevered sections, with forward edges of said first and second high stress layers being adjacent said first and second scribe lines, respectively.

34. The method of claim 33, wherein said first and second high stress layers each consist of a metal exhibiting a high tensile stress.

35. The method of claim 25, further including the steps of forming said plurality of first and second waveguides within common first and second cladding layers, respectively, that extend the length of said slotway.

36. The method of claim 25, wherein the cleaves for said first and second cantilevered waveguide sections each extend the entire width of said substrate.

37. The method of claim 25, further including after the cleaving of said first and second cantilevered waveguide sections, the steps of:
   severing away from its associated remaining portion of undercut substrate, the remaining plurality of first waveguides, their common first cladding layer, and underlying substrate; and
   severing away from its associated remaining portion of undercut substrate, the remaining plurality of second waveguides, their common second cladding layer, and underlying substrate.

38. The method of claim 1, wherein said cleaving step includes cleaving said first cladding layer a transverse distance of at least three times a width of one of said plurality of first waveguides.

39. The method of claim 1, wherein said cleaving step includes cleaving said first cladding layer a transverse distance of at least ten times a width of one of said plurality of first waveguides.

40. An integrated optical waveguide device comprising:
   a substrate;
   a linear slotway dividing the substrate into a first portion and a second portion;
   a plurality of first waveguides formed on said second portion, said plurality of first waveguides each having a longitudinal axis perpendicular to the slotway; and
   a single smooth cleaved edge adjacent to the slotway and intersecting said plurality of first waveguides, thereby providing smooth inner endfaces for said plurality of first waveguides, respectively.

41. The device of claim 40, further including a high stress layer on said plurality of first waveguides.

42. The device of claim 40, further including an etched out area of substrate below said cleaved edge under said plurality of first waveguides.

43. The device of claim 42, wherein the etched area is an isotropic etched area.

44. The device of claim 42, wherein the etched area is an anisotropic etched area.

45. The device of claim 40, wherein said cleaved edge extends across the entire width of said substrate.

46. The device of claim 40, wherein said slotway is a dicing saw cut slotway.

47. The device of claim 40, further including:
   a plurality of parallel grooves formed in said first portion of said substrate, with respective longitudinal axes being perpendicular to the longitudinal axes of said slotway.

48. The device of claim 47, wherein said slotway further includes a dicing saw cut surface adjacent to said plurality of grooves, and an etched surface adjacent to said plurality of first waveguides.

49. The device of claim 47, wherein said plurality of parallel grooves are each V-shaped.

50. The integrated optical waveguide device of claim 40, further including:
   a plurality of second waveguides formed on said first portion, said plurality of second waveguides each having a longitudinal axis perpendicular to the slotway; and
   a single smooth cleaved edge adjacent to the slotway and intersecting the second waveguides, thereby providing smooth inner endfaces for said plurality of second waveguides, respectively.

51. The device of claim 50, further including first and second high stress layers on said plurality of first and second waveguides, respectively.

52. The device of claim 50, further including etched out areas of substrate below cleaved edges of said plurality of first and second waveguides, respectively.

53. The device of claim 52, wherein the etched out areas are isotropic etched areas.

54. The device of claim 52, wherein the etched out areas are anisotropic etched areas.

55. The device of claim 50, wherein the cleaved edges of said plurality of first and second waveguides, respectively, extend across the entire width of said substrate.

56. The device of claim 50, wherein said slotway is a dicing saw cut slotway.

57. The device of claim 40, wherein said plurality of first waveguides include:
   a first cladding layer formed on said second portion of said substrate;
   a plurality of first waveguide cores spaced apart from one another, and formed on said second portion of said substrate within said first cladding layer; and
   said first cladding layer being cleaved a transverse distance of at least three times a width of one of said plurality of first waveguide cores.

58. The device of claim 40, wherein said plurality of first waveguides include:
   a first cladding layer formed on said second portion of said substrate;
   a plurality of first waveguide cores spaced apart from one another, and formed on said second portion of said substrate within said first cladding layer; and
   said first cladding layer being cleaved a transverse distance of at least ten times a width of one of said plurality of first waveguide cores.

59. The device of claim 50, wherein said plurality of first waveguides include:
   a first cladding layer formed on said second portion of said substrate;
   a plurality of first waveguide cores spaced apart from one another, and formed on said second portion of said substrate within said first cladding layer; and
   said first cladding layer being cleaved a transverse distance of at least three times a width of one of said plurality of first waveguide cores.

60. The device of claim 59, wherein said plurality of second waveguides include:
   a second cladding layer formed on said first portion of said substrate;
   a plurality of second waveguide cores spaced apart from one another, and formed on said first portion of said substrate within said second cladding layer; and
   said second cladding layer being cleaved a transverse distance of at least three times a width of one of said plurality of second waveguide cores.

61. The device of claim 50, wherein said plurality of first waveguides include:
- a first cladding layer formed on said second portion of said substrate;
- a plurality of first waveguide cores spaced apart from one another, and formed on said second portion of said substrate within said first cladding layer; and
- said first cladding layer being cleaved a transverse distance of at least ten times a width of one of said plurality of first waveguide cores.

62. The device of claim 59, wherein said plurality of second waveguides include:
- a second cladding layer formed on said first portion of said substrate;
- a plurality of second waveguide cores spaced apart from another, and formed on said first portion of said substrate within said second cladding layer; and
- said second cladding layer being cleaved a transverse distance of at least ten times a width of one of said plurality of second waveguide cores.

* * * * *